UNITED STATES PATENT OFFICE.

ALFRED N. ATWOOD, OF PHILADELPHIA, PENNSYLVANIA.

IMPROVEMENT IN COMPOUNDS FOR THE MANUFACTURE OF PICTURE AND SIMILAR FRAMES.

Specification forming part of Letters Patent No. 159,629, dated February 9, 1875; application filed April 28, 1874.

*To all whom it may concern:*

Be it known that I, ALFRED N. ATWOOD, of the city and county of Philadelphia, in the State of Pennsylvania, have invented a certain Compound for the Manufacture of Frames for Mirrors, Photographs, &c., of which the following is a specification:

My invention relates to a composition for picture and similar frames; and consists of a mixture of asphaltum, asbestus, silica, and soapstone, in the following proportions: Asphaltum, fifty parts; asbestus, twenty-five parts; silica, fifteen parts; soapstone, ten parts.

These ingredients I mix together in a heated state, and pour the compound into suitable molds for the formation of the various articles to be manufactured.

Although I prefer the proportions above given, I do not confine myself to them, as other proportions may be used without departing from my invention.

I claim as my invention—

The described composition for the manufacture of picture and similar ornamental frames and moldings, consisting, essentially, of asbestus, silica, soapstone, and asphaltum, combined in the manner and in about the proportions set forth.

ALFRED N. ATWOOD.

Witnesses:
   THOMAS J. BEWLEY,
   STEPHEN USTICK.